Feb. 11, 1941.  E. T. FRICE  2,231,220
VEHICLE BRAKE MECHANISM
Filed Aug. 19, 1938
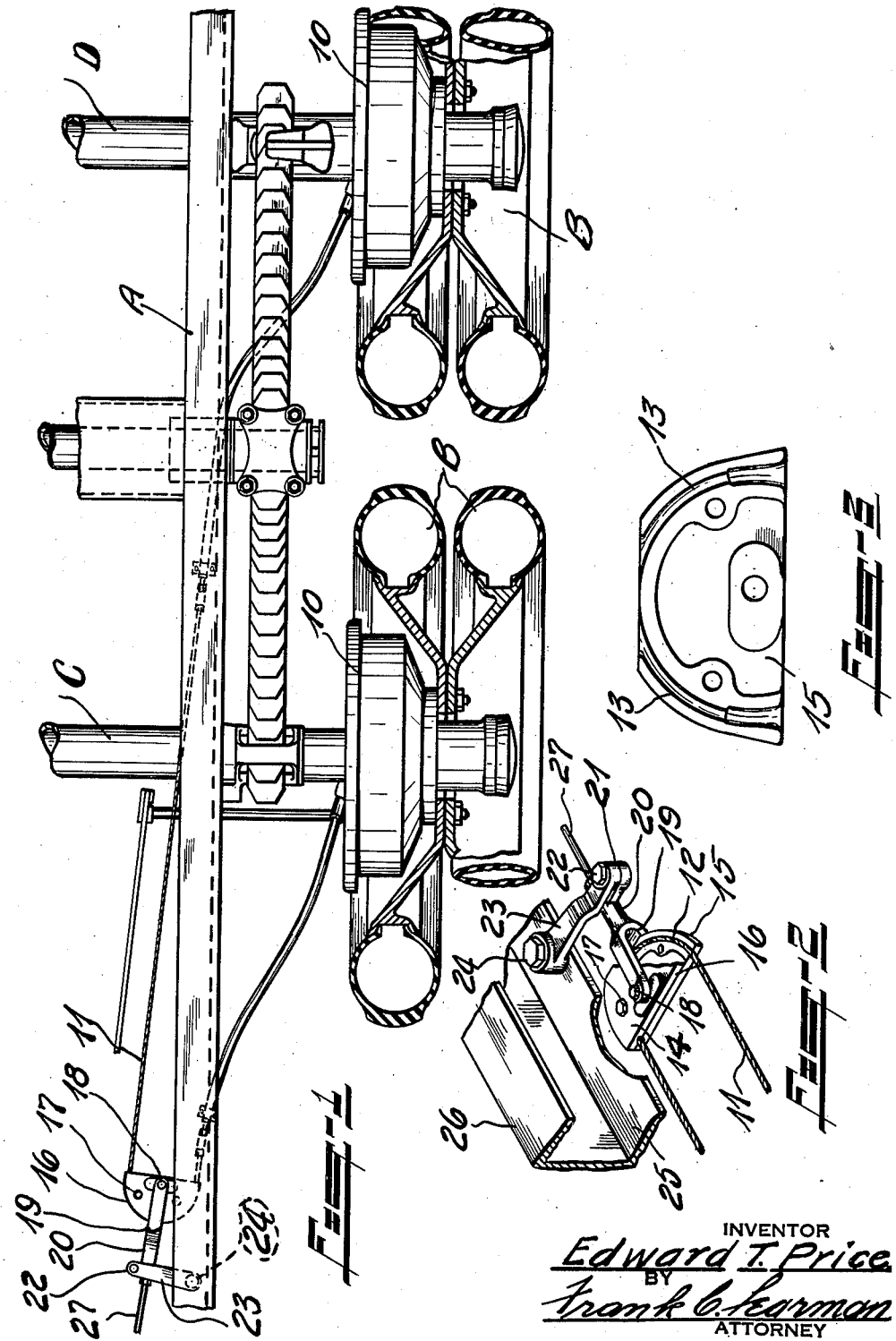
INVENTOR
Edward T. Price
BY
Frank C. Fearman
ATTORNEY Patented Feb. 11, 1941

2,231,220

UNITED STATES PATENT OFFICE 2,231,220

VEHICLE BRAKE MECHANISM

Edward T. Price, Cadillac, Mich., assignor to Cadillac Malleable Iron Co., Cadillac, Mich., a corporation of Michigan Application August 19, 1938, Serial No. 225,754

14 Claims. (Cl. 188—2)

The invention relates to vehicle brake mechanism and more especially to brake mechanism for vehicles having two axles arranged in tandem at the rear end of said vehicle.

The primary object of the invention is the provision of mechanism of this character, wherein the braking force is divided between two brakes on either side of a vehicle in any described proportion, that is, greater force can be applied to the foremost brake than to the rearmost brake of a tandem of brakes.

Another object of the invention is the provision of mechanism of this character, wherein a novel assembly is established whereby the end of the cable from one brake on the front tandem axle is connected to the end of the cable from one brake of rear tandem axle while a rotating element is located between said brakes and cooperates with the cable, the proportional applied force of the brakes being changed according to the location of said element with respect to the longitudinal axis of the chassis frame of the vehicle.

A further object of the invention is the provision of mechanism of this character, wherein the construction and assembly are novel in entirety, the construction being applicable to variable makes of motor vehicles, and adaptable to cable operated brakes for the same.

A still further object of the invention is the provision of mechanism of this character, which is extremely simple in construction, thoroughly reliable and efficient in operation, dependable for proportional braking action, strong, durable, and inexpensive to manufacture and install.

With these and other objects in view the invention consists in the features of construction, combination and arrangement of parts as will be hereinafter more fully described in detail, illustrated in the accompanying drawing which discloses the preferred embodiment of the invention, and pointed out in the claims hereunto appended.

In the accompanying drawing—

Fig. 1 is a fragmentary plan view partly in section of a tandem axle set up for a vehicle showing the rotatable mechanism constructed in accordance with the invention applied.

Fig. 2 is a fragmentary perspective view showing the rotatable element and adjuncts.

Fig. 3 is a plan view of a section of said element looking toward the inner face of said section.

Similar reference characters indicate corresponding parts throughout the several views in the drawing.

Referring to the drawing in detail, A designates a portion of a vehicle chassis frame of conventional type, B pneumatic tired traction wheels of double type and C and D fore and aft axles, respectively, in tandem at each side of the vehicle frame. Each double type wheel is accompanied with an operable brake 10, which is preferably of the cable operated type.

An operating cable 11 is connected to and leads from the brake 10 for the double wheel on the fore axle C to the brake 10 on the aft axle D, being connected with said latter brake. This cable 11 is looped as at 12, this portion being seated in a loop-way 13, created in sections 14 and 15, respectively, of a rotatable element 16. This element 16 is of substantially half circular form, being divided in halves constituting the sections 14 and 15, which are secured together by fasteners, one being indicated at 17, so that the loop 12 in the cable 11 will be firmly clamped in the element 16 and this cable is removable therefrom when desired.

The element 16 is rotatable on a yoke pin 18 mounted in a yoke 19 of a clevis 20, its stem having an off-set ear 21 pivoted at 22 to a swinging lever 23. This lever 23 swings on a hanger pivot 24 mounted, in this instance in the lower flange 25 of the side beam 26 of the chassis frame A. The stem of the clevis 20 has direct connection at 28 with a brake rod 27 which is pedal operated or otherwise controlled, being not shown.

It is, of course, understood that the foregoing description applies to the brakes and adjuncts at one side of the vehicle chassis, while the two brakes at the other side of said chassis will be connected in essentially the same way.

The lever 23 may be termed an idle lever and functions as a stabilizer in its connection with the working of the rotatable mechanism.

In operation force applied to the brake rod 27 is transmitted to the device 20 and to the rotatable element 16 at the pin 18 where it is differentially divided and part of the force is then transmitted to the brake 10 for the wheels B on the fore axle C and the other part of the force is carried to brake 10 for the wheels B on the aft axle D. The proportional force to each brake depends on the location of the pin 18 with relation to the axis of the element 16. Movement of the point 18 towards the longitudinal center of the vehicle chassis will increase the force to the brake affecting the aft axle D and decrease the force to the brake affecting the fore axle C. It is not to be construed that the position of pin 18 is adjustable, this position being fixed after the proper proportion of force to each brake has been determined experimentally.

What I claim is:

1. The combination of brakes arranged in tandem, a single connector looped between said brakes, and operable means adjustably receiving the loop of said connector for differentially dividing the actuating force between the brakes.

2. The combination of a pair of brakes, a single element means for imparting movement to the brakes in unison with each other, and rotary means associated with said single element means for differentially dividing the actuating force through said single element means to said brakes.

3. The combination of a pair of brakes, an unbroken single element means for imparting movement to the brakes in unison with each other, revolvable means associated with said single element means for differentially dividing the actuating force between said brakes through the single element means, and a stabilizer cooperating with the last named means.

4. A mechanism for a pair of brakes for a vehicle, comprising a rotating member, an unbroken single connector looped between the pair of brakes and adjustably clamped in said member at the loop, and means shiftably supporting the rotating member.

5. A mechanism for a pair of brakes for a vehicle, comprising a rotary member, an unbroken flexible connector between the brakes and having the member fixed thereto for differentially dividing the actuating force between the brakes, and a shiftable support for the rotating member.

6. The combination of a pair of brakes, a single flexible connector looped between and engaged with the brakes, pivotally mounted means adapted to receive the loop of said connector and adjustably accommodating the same and means for holding the connector against sliding therein.

7. The combination of a pair of brakes, a single flexible connector looped between and engaged with the brakes, pivotally mounted clamping means adapted to receive the loop of said connector and adjustably accommodating the same, means for holding the connector against sliding therein, and means shiftably supporting said first named means.

8. The combination of a pair of brakes, a single flexible connector looped between and engaged with the brakes, rotary means adapted to receive the loop of said connector and adjustably accommodating the same, means for holding the connector against sliding therein, and means shiftably supporting said first named means, said first named means including clamping members having a way for the loop of the connector.

9. The combination of a pair of brakes, a single flexible connector looped between and engaged with the brakes, rotary means adapted to receive the loop of said connector and adjustably accommodating the same, means for holding the connector against sliding therein, means shiftably supporting said rotary means, said rotary means including clamping members having a way for the loop of the connector, and means pivotally supporting said shiftable means.

10. The combination of a pair of brakes, a single flexible connector looped between and engaged with the brakes, revolvably mounted means adapted to receive the loop of said connector and adjustably accommodating the same, means for holding the connector against sliding therein, means shiftably supporting said first named means, said first named means including clamping members having a way for the loop of the connector, means pivotally supporting said shiftable means, and a yoke connection with a shiftable means and rotatably supporting the revolvably mounted means.

11. The combination of brakes arranged in tandem, an unbroken flexible connector looped between said brakes and operably associated therewith and shiftable revolvable means adjustably fixed to said connector at the loop thereof for varying the applied braking force to the brakes respectively.

12. The combination of brakes arranged in tandem, an unbroken flexible connector looped between said brakes and operably associated therewith, shiftable revolvable means adjustably fixed to said connector at the loop thereof for varying the applied braking force to the brakes respectively, and means for swingingly supporting said revolvable means.

13. The combination of a pair of brakes, a single flexible connector looped between and engaged with the brakes, and an eccentrically mounted means at the loop of said connector for differentially dividing the actuating force between the brakes.

14. The combination of a pair of brakes, a flexible connector looped between and engaged with said brakes, rotatable eccentrically mounted means at the loop of said connector for differentially dividing the actuating force between the brakes, and means swingingly supporting said rotatable means.

EDWARD T. PRICE.